(12) United States Patent
Devine

(10) Patent No.: US 7,410,584 B2
(45) Date of Patent: Aug. 12, 2008

(54) METHODS AND APPARATUS FOR TREATING WASTEWATER EMPLOYING A HIGH RATE CLARIFIER AND A MEMBRANE

(75) Inventor: Jeffrey S. Devine, The Woodlands, TX (US)

(73) Assignee: Ashbrook Simon-Hartley Operations, LP, Houston, TX (US)

( * ) Notice: Subject to any disclaimer, the term of this patent is extended or adjusted under 35 U.S.C. 154(b) by 0 days.

(21) Appl. No.: 11/868,811

(22) Filed: Oct. 8, 2007

(65) Prior Publication Data
US 2008/0116130 A1    May 22, 2008

Related U.S. Application Data

(63) Continuation of application No. 11/047,296, filed on Jan. 31, 2005, now Pat. No. 7,279,100.

(51) Int. Cl.
*C02F 3/30* (2006.01)
*C02F 3/12* (2006.01)

(52) U.S. Cl. .................. 210/605; 210/623; 210/630; 210/259; 210/532.1; 210/903; 210/906

(58) Field of Classification Search .................. 210/606, 210/614, 620, 621, 623, 630, 252, 259, 513, 210/532.1, 903, 906
See application file for complete search history.

(56) References Cited

U.S. PATENT DOCUMENTS

| 3,423,309 A | 1/1969 | Albertson |
| 3,482,695 A | 12/1969 | Rice et al. |
| 4,530,569 A | 7/1985 | Squire |
| 4,536,286 A | 8/1985 | Nugent |
| 4,565,855 A | 1/1986 | Anderson et al. |
| 4,707,261 A | 11/1987 | Ikeyama et al. |

(Continued)

FOREIGN PATENT DOCUMENTS

JP     61-220792    10/1986

OTHER PUBLICATIONS

Gould, B., Utilizing Spiral Wound Membrane Efficiencies for Ultrafiltration by Enabling Backflush Capabilities, 12th Ann Southwest Chemistry Workshop, Jul. 28, 2003, Dallas, TX.

(Continued)

*Primary Examiner*—Fred Prince
(74) *Attorney, Agent, or Firm*—Pramudji Wendt & Tran, L.L.P.; Jeffrey L. Wendt

(57) ABSTRACT

Methods and apparatus for treating wastewater are described, one method embodiment including the steps of flowing a stream comprising mixed liquor suspended solids and fixed growth solids to a high rate clarification stage, forming a clarifier effluent, a first waste activated sludge stream, and a return waste activated sludge stream. The high rate clarifier effluent stream then flows to a membrane stage that includes a membrane media, producing a membrane reject (retentate) stream and a treated effluent (permeate) stream. Optionally, the methods include routing a screened raw wastewater to an anaerobic and/or aerated anoxic stage and introducing a gas comprising oxygen to the wastewater during the aerated anoxic stage, and optionally allowing the product of this stage to flow to an aeration stage prior to the high rate clarification stage.

25 Claims, 4 Drawing Sheets

U.S. PATENT DOCUMENTS

| | | | |
|---|---|---|---|
| 4,747,946 A | 5/1988 | Ikeyama et al. |
| 4,754,009 A | 6/1988 | Squire |
| 4,778,601 A | 10/1988 | Lopatin et al. |
| 4,828,772 A | 5/1989 | Lopatin et al. |
| 4,867,883 A | 9/1989 | Daigger et al. |
| 4,957,628 A | 9/1990 | Schulz |
| 4,992,178 A | 2/1991 | Chaufer et al. |
| 5,522,991 A | 6/1996 | Tuccelli et al. |
| 5,565,166 A | 10/1996 | Witzko et al. |
| 5,651,889 A | 7/1997 | Wataya et al. |
| 5,698,281 A | 12/1997 | Bellantoni et al. |
| 5,972,220 A | 10/1999 | Bailey |
| 6,068,134 A | 5/2000 | Shurtleff |
| 6,110,374 A | 8/2000 | Hughes |
| 6,165,359 A | 12/2000 | Drewery |
| 6,168,648 B1 | 1/2001 | Ootani et al. |
| 6,190,557 B1 | 2/2001 | Hisada et al. |
| 6,221,247 B1 | 4/2001 | Nemser et al. |
| 6,274,044 B1 | 8/2001 | Bailey et al. |
| 6,402,956 B1 | 6/2002 | Andou et al. |
| 6,406,629 B1 | 6/2002 | Husain et al. |
| 6,432,310 B1 | 8/2002 | Andou et al. |
| 6,446,073 B1 | 9/2002 | Daigger et al. |
| 6,454,104 B1 | 9/2002 | Bailey et al. |
| 6,485,645 B1 | 11/2002 | Husain et al. |
| 6,524,481 B2 | 2/2003 | Zha et al. |
| 6,533,937 B1 | 3/2003 | Adachi et al. |
| 6,555,002 B2 | 4/2003 | Garcia et al. |
| 6,565,747 B1 | 5/2003 | Shintani et al. |
| 6,592,762 B2 | 7/2003 | Smith |
| 6,605,220 B2 | 8/2003 | Garcia et al. |
| 6,723,244 B1 | 4/2004 | Constantine |
| 6,733,675 B2 | 5/2004 | Ando et al. |
| 6,863,817 B2 | 3/2005 | Liu et al. |
| 6,863,818 B2 | 3/2005 | Daigger et al. |
| 6,890,431 B1 | 5/2005 | Eades et al. |
| 6,982,036 B2 | 1/2006 | Johnson |
| 7,014,763 B2 | 3/2006 | Johnson et al. |
| 7,022,236 B2 | 4/2006 | Liu et al. |
| 7,147,778 B1 | 12/2006 | DiMassimo et al. |
| 7,182,872 B2 | 2/2007 | Barak et al. |
| 7,279,100 B2 | 10/2007 | Devine |
| 7,294,275 B1 | 11/2007 | Sibrell |
| 2002/0003116 A1* | 1/2002 | Golden ............... 210/759 |
| 2003/0205524 A1 | 11/2003 | Chisholm et al. |

OTHER PUBLICATIONS

Trisep Corp., SpiraSep Ultrafiltration Membrane Technology, Spiral Wound Backflushable Ultrafiltration Element, 2003, TriSep Corporation, Goleta, CA.

Ashbrook Corpration, Denitrification, May 15, 2003, 1 page, accessed at http://www.ashbrookcorp.com/learn/denitrification.html.

Ashbrook Corporation, Nitrification, May 15, 2003, 1 page, accessed at http://www.ashbrookcorp.com/learn/nitrification.html.

Ashbrook Corporation, Biological Nutrient Removal Systems, May 15, 2005, 1 page, accessed at http://www.ashbrookcorp.com/learn/biological.html.

Ashbrook Corporation, Phosphorous Removal, May 15, 2003, 1 page, accessed at http://www.ashbrookcorp.com/learn/phosphorous.html.

* cited by examiner

METHODS AND APPARATUS FOR TREATING WASTEWATER EMPLOYING A HIGH RATE CLARIFIER AND A MEMBRANE

BACKGROUND INFORMATION

1. Technical Field

The invention is generally related to the field of wastewater treatment. More specifically, the invention relates to novel apparatus and methods of using same which address problems of organic pollutants, nitrogen, phosphorous, and/or coliform bacteria and other microorganism removal from residential, municipal, and/or industrial wastewater.

2. Background Art

A conventional method for reducing organic material, nitrogen and phosphorous in industrial wastewater is presented in FIG. 1. Prior art embodiment 40 comprises a source of screened, raw wastewater 42, a mixed only anoxic stage 44, an aeration stage 46, a clarifier 48, a filter stage 50, and a chlorination stage 52, the process producing a treated effluent at 54. A waste activated sludge holding tank 56 is also represented. Also illustrated in embodiment 40 are conduits 70, 72, and 74. Conduit 70 routes waste activated sludge from clarifier 48 to waste activated sludge holding tank 56, while conduit 74 returns waste activated sludge from clarifier 48 back to the mixed only anoxic stage 44. Finally, conduit 72 routs mixed liquor suspended solids return from an aeration stage 46 back to a mixed only anoxic stage 44. This process and apparatus does not utilize a high rate clarifier or a membrane stage.

U.S. Pat. Nos. 6,406,629 and 6,485,645 describe a wastewater treatment process for biologically removing phosphates incorporating a membrane filter. The process includes three zones, an anaerobic zone, an anoxic zone and an aerobic zone containing an anaerobic, anoxic and aerobic mixed liquor suspended solids (MLSS). Water to be treated flows first into the anaerobic zone. Anaerobic mixed liquor flows to the anoxic zone. Anoxic mixed liquor flows both back to the anaerobic zone and to the aerobic zone. The aerobic MLSS flows to the anoxic zone and also contacts the feed side of a membrane filter. The membrane filter treats the aerobic MLSS to produce a treated effluent lean in phosphorous, nitrogen, COD, suspended solids and organisms at a permeate side of the membrane filter and a liquid rich in rejected solids and organisms. Some or all of the material rejected by the membrane filter is removed from the process either directly or by returning the material rejected by the membrane filter to the anoxic or aerobic zones and wasting aerobic sludge. In a first optional side stream process, phosphorous is precipitated from a liquid lean in solids extracted from the anaerobic mixed liquor. In a second optional side stream process, anaerobic mixed liquor is treated to form insoluble phosphates that are removed in a hydrocyclone. While the patents do describe use of a membrane, there is no provision made for reducing the load of solids to the membrane, and no description of a high rate clarifier. In fact, conventional membrane bioreactors often must recirculate large flows from the membrane zone to the basins holding MLSS to help prevent excessive build-up of the retentate solids. The recirculation flow can be up to four (4) times the plant influent flow. Moreover, the patent does not describe a packaged system including a high rate clarifier.

U.S. Pat. Nos. 6,068,134; 6,274,044; and 6,454,104 disclose clarifiers useful in wastewater treatment. For example, the 104 patent discloses a clarifier in a sewage treatment process that includes efficient scum removal within the influent well, with discharge of the scum and other floatables as a dedicated waste stream separate from return activated sludge and biological scum collected in the clarifier. U.S. Pat. No. 5,972,220 discloses recycling of slurries in a wastewater treatment process. None of these patents discloses the use of a membrane or high rate clarifier.

U.S. Pat. No. 6,524,481 discloses a method and apparatus for cleaning a membrane module, where the module is employed in submerged fashion in a wastewater treatment facility. The membrane module typically has a plurality of porous membranes. The membranes are arranged in close proximity to one another and mounted to prevent excessive movement there between. Means are provided for entraining gas bubbles in a liquid flow such that, in use, the liquid and bubbles entrained therein move past the surfaces of the membranes to dislodge fouling materials there from. The gas bubbles may be entrained into the liquid using a venturi type device.

U.S. Pat. No. 6,165,359 discloses use of a second clarifier in a wastewater treatment facility. A high strength wastewater treatment system having a first tank with an inlet and an outlet, an aerator positioned within the first tank for passing oxygen into wastewater within the first tank, a second tank having a clarifier compartment positioned therein, an aeration device positioned in the second tank for passing oxygen into a liquid within the second tank, and a pipe connected to the first tank and the second tank for passing liquid from the second tank to the first tank. The second is interconnected to the outlet of the first tank. The second tank has an outlet extending from the clarifier compartment. In particular, the pipe has an end opening within the second tank and a diffuser connected to the pipe within the first tank. The diffuser is a venturi diffuser having a narrow section and a wide section. An air pump is connected to the venturi diffuser for injecting air into the narrow section. This delivery of air serves to draw liquid from the second tank through the pipe and into the first tank. The end of the pipe opens below the clarifier compartment in the second tank.

As discussed in U.S. Pat. No. 6,221,247, microfiltration and ultrafiltration are two recognized types of membrane separation processes. See Membranes: Learning a Lesson from Nature, Koros, W. J., Chemical Engineering Progress, October 1995, pp. 68-80, the disclosure of which is incorporated herein by reference. These processes are known for such representative utilities as processing corn-stillage streams, concentrating emulsions and cell suspensions, reducing bacteria and particulate turbidity, recovering paint, removing oil microemulsion and separating biomolecules and virus from aqueous streams.

In microfiltration and ultrafiltration the mechanism for separation involves sieving of primarily liquid feed streams containing suspended species through a microporous membrane. The driving force for separation is a transmembrane pressure differential, i.e., the feed stream side is placed at a higher pressure than the filtrate stream side to force the liquid through the membrane pores. The transmembrane pressure gradient can be created by applying a pressure to the feed and/or by drawing a vacuum on the filtrate. Of course, suspended species of size larger than the membrane pores are rejected which yields a filtrate free of large species and a retentate stream concentrated in the rejected species.

Microfiltration and ultrafiltration suffer from the serious drawback that the membrane tends to foul over time in service. That is, as filtration continues the pores become blocked which reduces and ultimately stops the separation process until the foulant is cleaned if possible, or the fouled membrane is replaced with virgin membrane. Fouling of microporous membranes in microfiltration and ultrafiltration has been studied extensively. While the mechanisms and theories concerning fouling are very complex, two general categories have been identified, namely deposition and adsorption fouling phenomena. Deposition fouling occurs as a result of hydrodynamic forces. The pressure gradient across the membrane actively pushes the foulant species into the pores. Adsorption fouling relates to the adhesiveness between the foulant and the membrane. Generally, suspended species to be separated from the feed liquid that have great affinity for the membrane material tend to adhere to the membrane at the surface and in the pores. The bulk of foulant species settling on and in the membrane prevents further transmembrane flow of liquid.

There is a need in the wastewater treatment art for improved methods of employing membranes in wastewater treatment facilities, which feature reduced load on the membrane while maintaining or increasing the reliability and consistency of the membrane to function as an activated sludge clarifier, a tertiary filter, and to provide acceptable reductions in bacterial counts.

SUMMARY OF THE INVENTION

The apparatus and methods of the present invention reduce or overcome many deficiencies of the prior art.

In accordance with an embodiment of the present invention, a method of treating wastewater comprises:
a) flowing a stream comprising mixed liquor suspended solids and fixed growth solids to a high rate clarification stage, thus forming a high rate clarifier effluent, a first waste activated sludge stream, and a return activated sludge stream; and
b) flowing the high rate clarifier effluent to a membrane stage comprising a membrane media, producing a membrane reject stream that is returned at some point upstream of the high rate clarification stage, and a treated effluent permeate stream. In some methods of the invention a second waste activated sludge stream may be produced.

The methods of the invention may include, upstream of the high rate clarification stage, optionally subjecting a screened raw wastewater to an anaerobic reaction stage for biological phosphorous removal, an optional aerated or mixed only anoxic stage downstream of the anaerobic reaction stage, and optionally introducing a gas comprising oxygen to the wastewater during the anoxic stage. The methods may also include allowing the product of the anoxic stage to flow to an aeration stage, producing the stream comprising mixed liquor suspended solids (MLSS) stream and fixed growth solids, as in the case if a hybrid activated sludge process is employed. According to industry standards, "hybrid activated sludge" means the combination of fixed-film/growth solids combined with suspended growth. Fixed growth solids typically involves growing a film of microbes attached to either high surface area, such as tumbling plastic shapes (engineered bug houses), or a film of microbes attached to netting material (similar to volleyball netting). The attached growth is also in the aeration basin with the suspended growth. The methods optionally include a host of options for recycling various streams to enhance nitrogen and phosphorous removal efficiencies, and typically involve various anaerobic and anoxic reactor configurations. For example, a portion of the first waste activated sludge stream may be returned to an aerated anoxic stage, if present. Another example might feature recycling a portion of the mixed liquid suspended solids stream to the aerated anoxic stage. Yet another example would include both return options.

An apparatus of the invention comprises:
a) a high rate clarifier adapted to accept a stream comprising mixed liquor suspended solids and fixed growth solids, and form a high rate clarifier effluent, a first waste activated sludge stream, and a return activated sludge stream; and
b) a membrane unit comprising a membrane, the membrane adapted to accept the high rate clarifier effluent, and produce a membrane reject stream and a treated effluent permeate stream.

Optionally, the apparatus includes an aerated or mixed only anoxic vessel fluidly connected to and upstream of the high rate clarifier; optional means for introducing a gas comprising oxygen to the wastewater in the anoxic vessel; an optional anaerobic reactor fluidly connect to and upstream of the anoxic vessel; and an optional aeration vessel for producing a stream comprising mixed liquor suspended solids and fixed growth solids. Means for producing a second waste activated sludge stream may be provided.

Further aspects and advantages of the invention will become apparent by reviewing the description of embodiments that follows.

BRIEF DESCRIPTION OF THE DRAWING

For a more complete understanding of the present invention, and the advantages thereof, reference is now made to the following descriptions taken in conjunction with the accompanying drawings, which are representative illustrations and not necessarily to scale, and in which.

DETAILED DESCRIPTION

Figure 3:
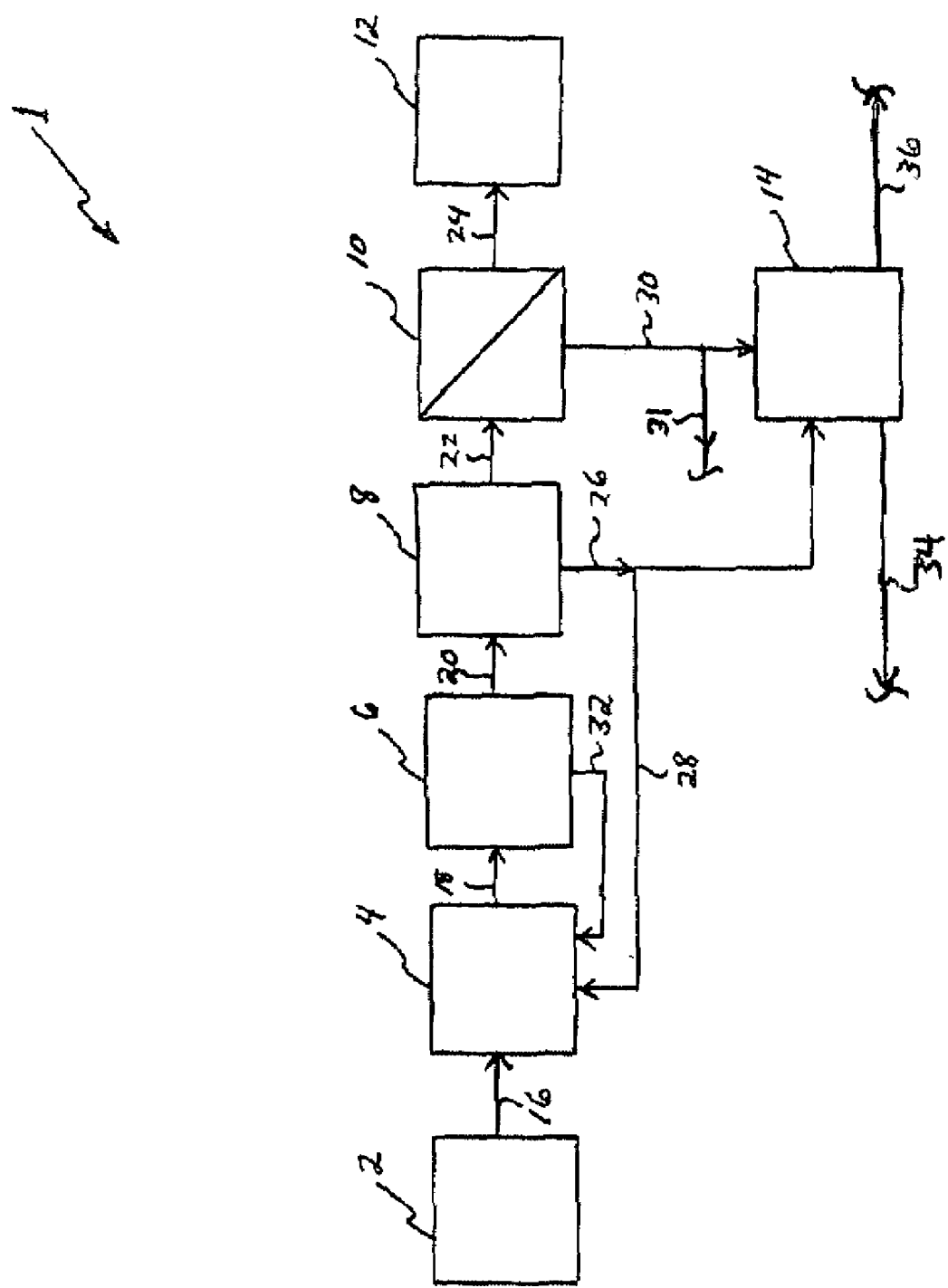
FIGS. 3, 4, and 5 illustrate schematically three processes of the invention.

FIG. 3 illustrates schematically a process of the invention. Embodiment 1 includes a source 2 of screened, raw wastewater, an aerated anoxic stage 4, an aeration stage, 6, a high rate clarifier, 8, and a membrane stage 10. Rather than completely replacing a clarifier with a membrane stage, the inventor herein has conceived methods and apparatus utilizing a combination of a high rate clarifier and a membrane stage. Stream 24 designates a treated effluent routed to storage or its final destination, designated as box 12, while box 14 represents a waste activated sludge (WAS) holding tank, or an aerobic digester, or an anaerobic digester. The various components of embodiment 1 illustrated in FIG. 3 are indicated schematically as being connected via conduits, although as will be described herein, the actual inventive apparatus employed to carry out the inventive processes may include compartmentalized units where stages are separated by divider walls. For example, the source of screened, raw wastewater 2 may be fed to aerated anoxic zone 4 through a conduit 16, aerated anoxic zone 4 may be connected to aeration zone 6 via a conduit 18, aeration zone 6 may be connected to high rate clarifier 8 via a conduit 20, high rate clarifier 8 may be connected to membrane stage 10 via a conduit 22, and membrane stage 10 may be connected to treated effluent 12 via a conduit 24. Membrane stage 10 may be connected to the WAS holding tank 14 via a membrane reject conduit 30, or some or all membrane reject stream may be recycled as RAS via a conduit 31 to a point upstream of high rate clarifier 8. Also illustrated in FIG. 3 is a conduit 26 connecting high rate clarifier 8 and WAS holding tank 14, a conduit 28 connecting high rate clarifier 8 and the aerated anoxic stage 4, and a conduit 32 connecting aeration stage 6 with aerated anoxic stage 4, allowing return of material from stage 6 back to stage 4. Conduit 28 allows return of activated sludge from high rate clarifier 8 back to aerated anoxic stage 4. The material traversing conduit 32 is typically denoted mixed liquor suspended solids (MLSS) return while the material traversing conduit 28 is typically referred to as return activated sludge (RAS). In certain embodiments of the invention, the MLSS stream also comprises fixed growth solids, as referred to earlier. Supernatant in holding tank 14 may be routed via a conduit 34 back to the source of raw waste water, and WAS may be routed via a conduit 36 to sludge handling/disposal.

Figure 1:
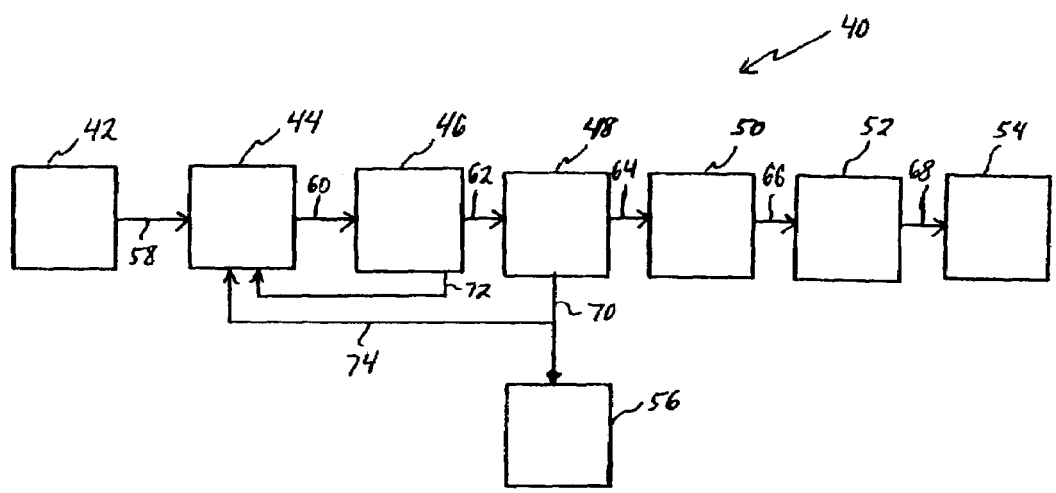
FIGS. 1 and 2 illustrate schematically two prior art processes.
Figure 2:
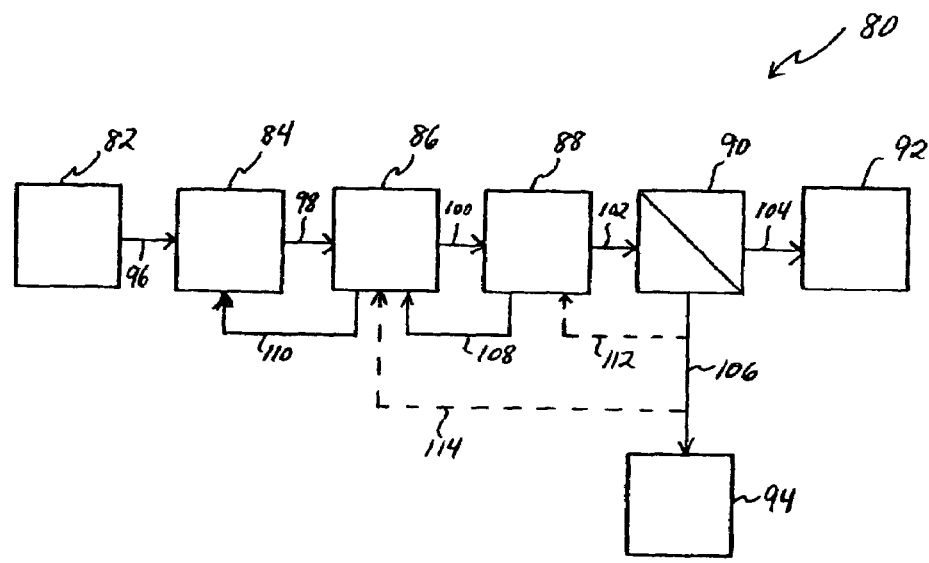

For comparison purposes, FIGS. 1 and 2 illustrate schematically two prior art processes. FIG. 1 illustrates prior art embodiment 40, which was described previously in the background section. As indicated, prior art embodiment 40 of FIG. 1 does not include a high rate clarification stage, nor does it include a membrane stage. Embodiment 80 of FIG. 2 does include a membrane stage, but again does not include a high rate clarifier. Referring specifically to FIG. 2, prior art embodiment 80 is a representation of an embodiment illustrated in FIG. 1 of U.S. Pat. No. 6,406,629. The 629 patent describes a source of raw wastewater 82, an anaerobic stage 84, an anoxic stage 86, an aerobic stage 88, a membrane stage 90, creating an effluent 92, and a waste activated sludge 94. Wastewater influent 82 is routed to the anaerobic stage 84 via a conduit 96, anaerobic stage 84 is connected to anoxic stage 86 via a conduit 98, anoxic stage 86 is connected to aerobic stage 88 via a conduit 100, aerobic stage 88 is connected to membrane stage 90 via a conduit 102, and membrane stage 90 creates a permeate stream 104, which is essentially the effluent stream 92. Membrane stage 90 also creates a retentate stream 106, which connects membrane stage 90 with WAS holding tank 94. Embodiment 80 of FIG. 2 also illustrates four possible return streams 108, 110, 112, and 114. Conduit 110 returns denitrified liquor from anoxic stage 86 to anaerobic stage 84. Conduit 108 routes nitrified liquor returned from the aerobic stage 88 back to anoxic stage 86. Conduits 112 and 114 are represented by dashed lines and not solid lines because they are optional, with conduit 112 offering the possibility of recycling WAS from membrane stage 90 back to aerobic stage 88 and conduit 114 recycling WAS from membrane stage 90 back to anoxic stage 86. Depending on the degree of build-up of solids in the membrane zone that is tolerable in any given treatment plant, these types of recirculation are required to help prevent excessive solids build-up.

It will be noted that the two prior art processes and apparatus illustrated schematically in FIGS. 1 and 2 do not disclose or suggest the combination of high rate clarification with a membrane stage. This arrangement has advantages in reducing the load of solids to the membrane, increasing the performance of the membrane and decreasing the amount of solids that flow to the membrane, thereby not only reducing cleaning requirements for the membranes, but also reducing or eliminating the need for recirculation of retained solids from the membrane zone to the zones containing MLSS and fixed growth solids, as in the prior art processes of FIGS. 1 and 2.

Figure 4:
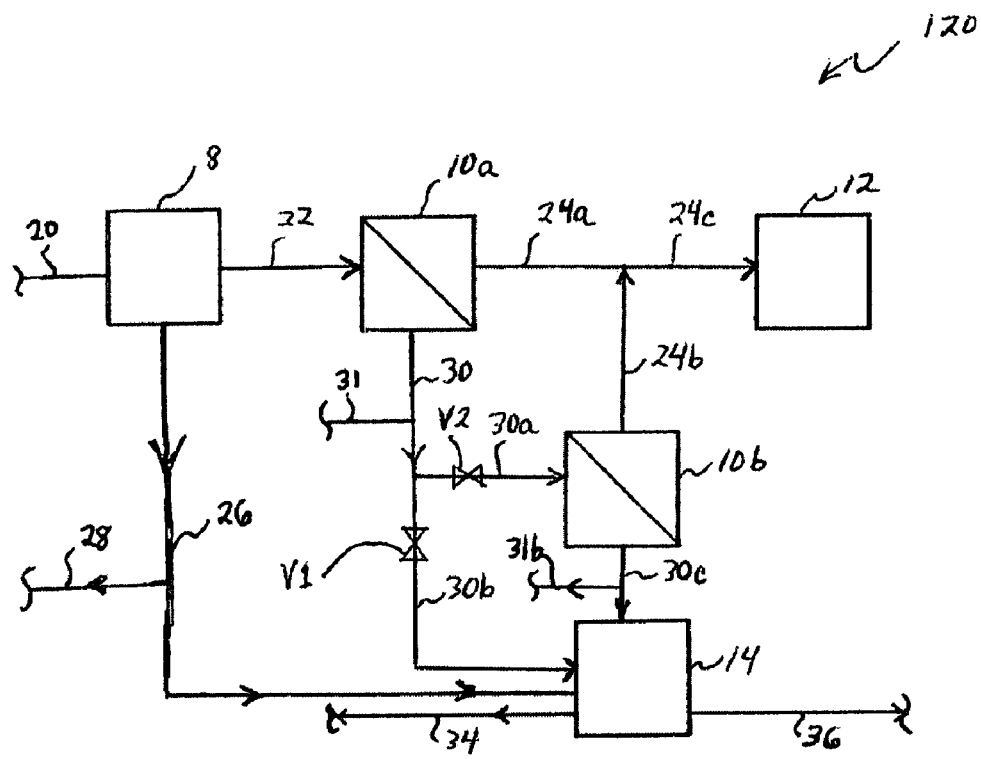
Figure 5:
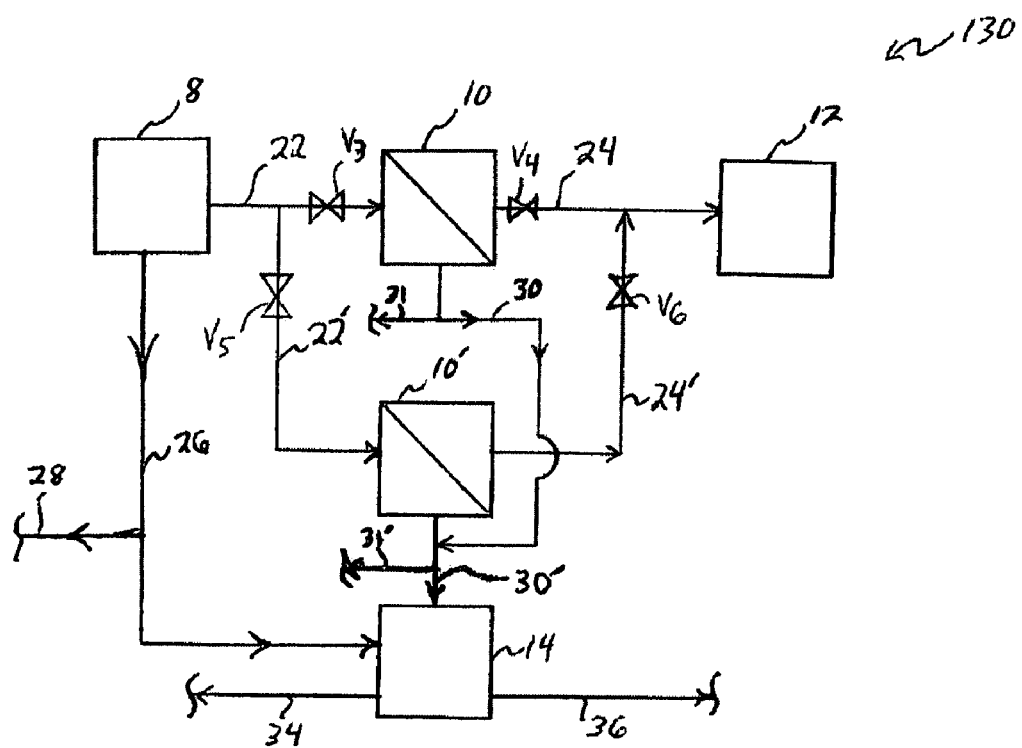

FIGS. 4 and 5 illustrate schematically embodiments 120 and 130, respectively of the invention, focusing on the clarification and membrane stages. It should be noted that the schematic diagrams of FIGS. 4 and 5 illustrate, for simplicity, conduits connecting the stages, but those skilled in the art will readily realize that the various stages may be connected via divider walls in a vessel. As in embodiment 1 of FIG. 3, both embodiments 120 and 130 allow some or all settled activated sludge to be routed via conduit 26 to WAS storage, or some or all activated sludge may be routed to via conduit 28 as RAS to aerated anoxic stage 4 or another point upstream of high rate clarifier 8. FIG. 4 illustrates an embodiment 120 where two membrane stages are used in series (more than two may be used when desired) to route membrane permeates (effluent) to their final destination, for example an outside water stream or effluent storage. High rate clarifier 8 feeds membrane unit 10a through a conduit 22, creating a retentate (membrane reject) stream of activated sludge 30. Activated sludge traversing through conduit 30 may proceed through valve V1 through conduit 30b to WAS holding tank 14, or may traverse through valve V2 and conduit 30a to second membrane stage 10b, thus producing a more concentrated activated sludge stream 30c. Some or all membrane retained activated sludge in conduits 30 and 30c may be returned to some point upstream of high rate clarification stage 8 via conduits 31 and 31b, respectively, as in embodiment 1 of FIG. 3. Supernatant in holding tank 14 may be routed via a conduit 34 back to the source of raw waste water, and WAS may be routed via a conduit 36 to sludge handling/disposal. Permeate stream 24a is combined with permeate stream 24b to form a combined permeate stream 24c which is then routed to its final destination or storage 12.

FIG. 5 illustrates a parallel arrangement of two membranes (more than two are possible, as desired) in embodiment 130. High rate clarifier 8 feeds clarified liquor through conduit 22 and valve V3 to membrane 10 creating an activated sludge stream which traverses conduit 30 to waste activated sludge holding tank 14. Alternatively or simultaneously, clarified liquor traverses through conduit 22' through valve V5 to second membrane 10', thus creating a second activated sludge stream 30' and a second permeate stream 24'. Valve V6 allows the second permeate to traverse to treated effluent holding at 12. Some or all of the activated sludge in conduits 30 and 30' may be routed via conduits 31 and 31', respectively, to points in the process upstream of high rate clarifier 8. Embodiment 130 illustrated in FIG. 5 allows a first membrane 10 to be taken out of service by closing valves V3 and V4 and opening valves V5 and V6. Similarly membrane 10' may be taken out of service by closing valves V5 and V6 and opening valves V3 and V4. Finally, all of valves V3, V4, V5, and V6 may be opened to utilize both membranes 10 and 10' simultaneously. As in FIGS. 3 and 4, supernatant in holding tank 14 may be routed via a conduit 34 back to the source of raw waste water, and WAS via a conduit 36 to sludge handling/disposal.

A membrane may be taken out of service for any number of reasons, for example, to replace the membrane media, or provide periodic backflushing and/or chemical cleaning of the membrane media. In order to delay membrane cleaning, a means for injecting air or other gaseous scouring agent, for example, oxygen-enriched air, may be employed in apparatus and methods of the invention. The scouring agent is typically under pressure of a few pounds per square inch. In certain embodiments, pressurized air may be used, as it is less expensive than oxygen-enriched air, industrial grade oxygen, or cryogenic grade oxygen. The scouring agent may contain oxygen, since it may also be used to aid in oxygenating the water. As the air, oxygen-enriched air, or industrial oxygen contain oxygen, in certain embodiments the membrane reject stream may be returned to the aeration basin as a means to recover the residual oxygen that is mass transferred to the liquid stream entering the membrane unit during scouring with the oxygen-containing gas. The oxygen containing gas for combined oxygenation and gas scouring may be applied continuously or intermittently to meet the system oxygen demand and scour objectives. Periodic flushing of scum and WAS may also be necessary. To further conserve energy imparted in the combined oxygenation and scour process, the membrane media in the membrane units may be submerged at a reasonable depth in the liquid being treated to enhance oxygen transfer to the reject (return) stream. Greater depth of submergence is directly proportional to greater oxygen mass transfer efficiency. In addition, greater depth of submergence may reduce or eliminate the suction pressure that is required to withdraw the permeate stream through the membrane, or may allow gravity flow through the membrane.

Figure 6:
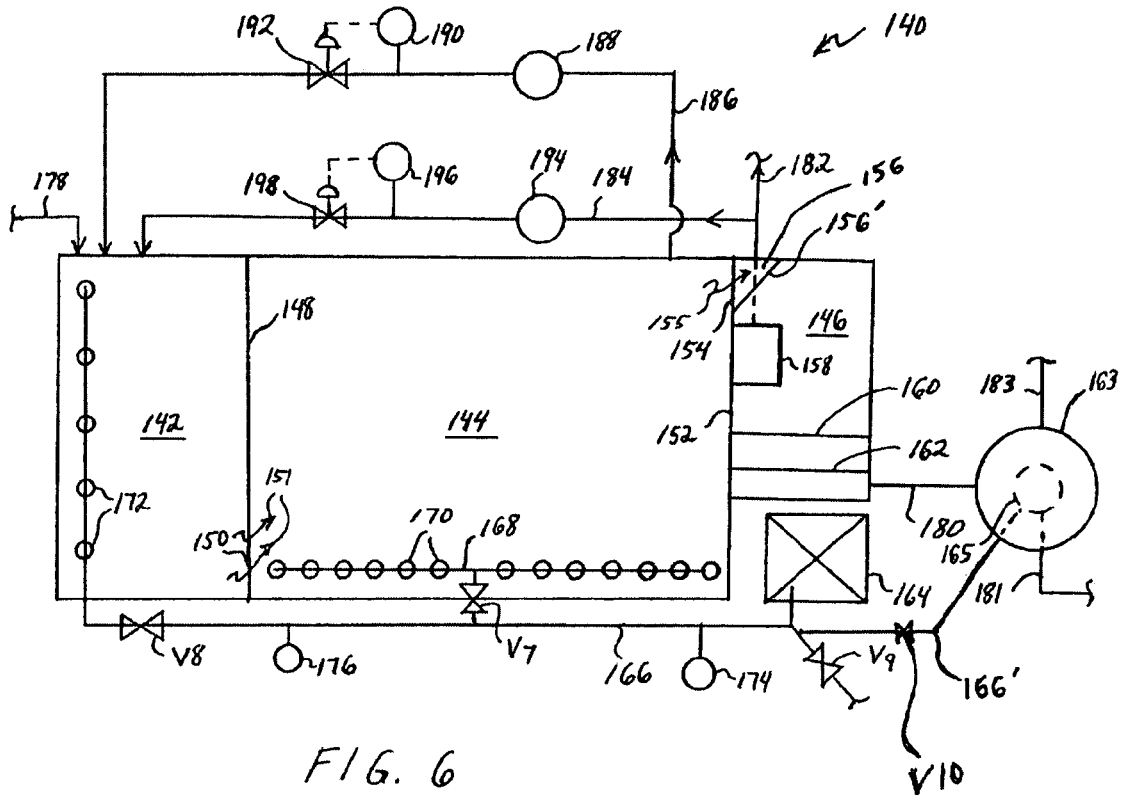
FIG. 6 illustrates a plan view, partially schematic, of an apparatus employing a high rate clarifier.
Figure 7:
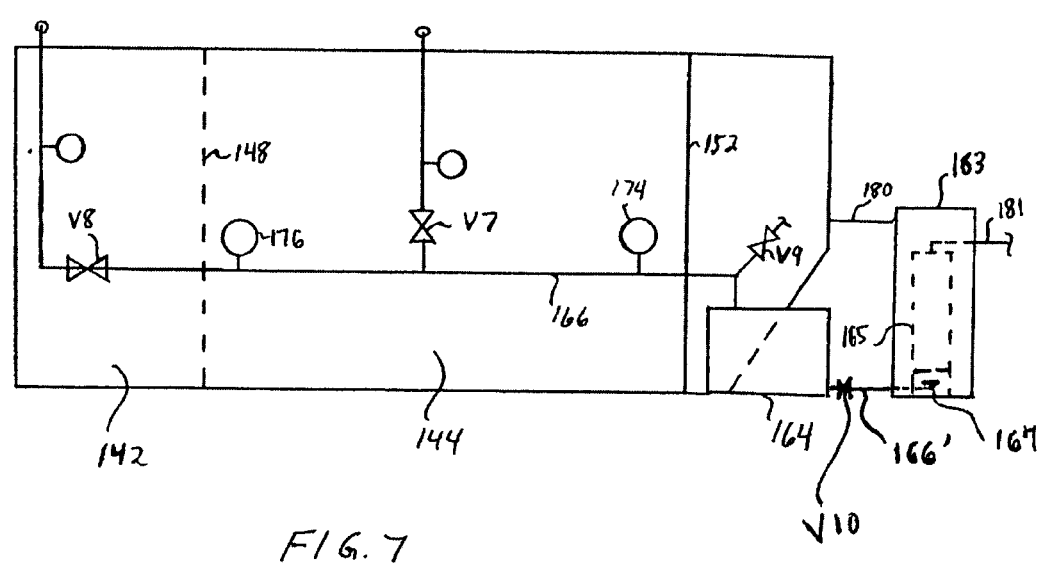
FIG. 7 illustrates a side elevation view, partially schematic, of the apparatus of FIG. 6.

FIGS. 6 and 7 illustrate plan and side elevation views, respectively, partial schematic, of embodiment 140 of the invention. Embodiment 140 comprises an aerated anoxic holding tank 142, an aeration stage 144, and a high rate clarifier 146. A divider wall 148 is represented having an engineered transfer port 150, showing material from the aerated anoxic zone 142 passing through to the aeration stage 144 illustrated by arrows 151. Another divider wall 152 is illustrated as well as a transfer port 154, which allows material from aeration stage 144 to pass as indicated at arrow 155 through an inlet energy dissipation zone 156 into high rate clarifier 146. A waste activated sludge collection zone 158 is depicted, along with a hydraulic optimization baffle, 156'. A V-notch weir 162 is illustrated, as well as a scum baffle, 160, in this particular embodiment. Illustrated at 164 is an air blower, whose power and volumetric flow requirements are largely dictated directly by the volume of wastewater being treated and the level of organic and nitrogenous pollutants in said wastewater. Air blower 164 feeds a conduit 166 which routes pressurized air through valves V7 and V8 to a conduit 168, and air diffusers 170 and 172. The flow of air may be controlled and measured via monitors 174 and 176. A wastewater influent conduit 178 is provided through which raw or pretreated wastewater will typically enter the unit into the aerated anoxic zone 142. High-rate clarified effluent is routed through a conduit 180 to a membrane unit 163 comprising a membrane 165. A conduit 182 routes a first waste activated sludge stream from waste activated sludge collection unit 158 to waste activated sludge storage (not illustrated). A conduit 181 routes treated effluent to its destination (storage, or river or stream for example) and a conduit 183 routes a second waste activated sludge stream to waste activated sludge storage or return to process to maintain optimal MLSS and fixed growth solids concentrations. Flow of treated effluent would most likely be controlled by a level controller on membrane unit 163 associated with a pump in conduit 181. The same pump, or another dedicated pump, could be used to periodically pump a reserve flow of treated effluent back through the membrane as a means to backflush the membrane in order to maintain acceptable flux and TMP. The level controller and pump are not critical to the invention and are not illustrated. Conduit 184 routes return activated sludge (RAS) back to aerated anoxic zone 142, while conduit 186 routes MLSS also comprising fixed growth solids return from aeration stage 144 back to aerated anoxic zone 142. A pump 188, flow measuring controller 190 and control valve 192 allow return of MLSS and fixed growth solids return while a pump 194, flow measuring controller 196 and control valve 198 allow RAS to be routed back to aerated anoxic stage 142. Also depicted in FIG. 6 is a valve V9 which allows blow off of pressure of air blower 164. Line 166' and valve V10 provide a means to direct air from blower 164 for oxygenation of the membrane zone and scouring of the membrane through an injection means 167. Injection means 167 may be selected from any suitable gas injection device, such as one or more open end pipes, pipes with plurality of holes, sintered metal plates, coarse or fine bubble gas diffusers, and the like.

A typical clarifier used in the wastewater treatment industry employs a hydraulic residence time (HRT) of roughly 2 to 6 hours at design average flow rate. High rate clarifiers, on the other hand, use an HRT that is much less than this. Clarifiers are sized on the basis of "surface overflow rate", and 200 to 500 gallons/day/ft$^2$ is typical for design average flow rates. As used herein a "high rate" clarifier is more than double the high end of this range, perhaps 1,000 to 10,000 gallons/day/ft$^2$ or more, or from 500 to about 2000 gallons/day/ft$^2$ at design average flow rates, with a HRT of typically less than 2 hours. The present inventive methods and apparatus are not seeking large removal of solids in the high rate clarifier, but removal of enough solids to off-load the membrane. The high rate clarifier may comprise a plate or tube settler. The aerated anoxic vessel, the aeration vessel, the high rate clarifier, and the membrane compartment may be part of a packaged wastewater treatment plant. The aerated anoxic vessel may include a coarse bubble diffuser, and packaged versions of the inventive apparatus may comprise a transfer port between the aerated anoxic vessel and the aeration vessel, a transfer port between the aeration vessel and the high rate clarifier, and a transfer port between the high rate clarifier and the membrane compartment. Also included is an inlet energy dissipation zone in the high rate clarifier, and a hydraulics optimization baffle in the high rate clarifier. The high rate clarifier may comprise an effluent box integral with the high rate clarifier.

In operation of the methods and apparatus of the invention, the first choice for wasting sludge is from the high rate clarifier and secondly from the membrane system to achieve the desired sludge age. The primary goal is to return only the best settling solids from the high rate clarifier. Scum forming and slow settling material is allowed to pass over the weirs and proceed to the membrane system where they would be wasted with WAS or returned as oxygenated return flow for additional treatment and stabilization. Over time, this arrangement should effectively select out the poorer settling bacteria (nocardia and severe filaments) and also provide an exceptional scum elimination system.

The density of the second WAS stream produced by the membrane unit is controlled by the operator to maximize the efficiency of the membrane. Alternatively, the reject from the membrane may be maintained at low total suspended solids concentrations so as to not impede the flux through the membrane. In this case the retentate may be returned to any point upstream of the membrane for further treatment such as to the aeration basin to gain the benefit of the oxygen enriched water in the membrane chamber. Previously known systems are limited in that the membranes are subjected to the full load of the MLSS and fixed growth solids, which is further concentrated at the membrane. That approach tends to prematurely foul the membrane.

During start-up and acclimation, the operator will have significant leeway in the amount of sampling and type of analytical work performed. The main goal during this period is to bring the plant up to steady state operation. This will perhaps best be determined by achieving a uniform and relatively constant MLSS and fixed growth solids concentration. Additionally, a good indication of achieving steady-state operation would be apparent through dissolved oxygen (DO) monitoring by conducting DO profiles and DO uptake rates across the vessels or basins. Grab samples may be collected from the anoxic vessel or basin once per day and analyzed for soluble TKN (Total Kjeldahl Nitrogen), ammonia, nitrate, and nitrite. At the same time as this grab sample is collected, a grab sample of the influent is typically collected and analyzed for TKN and a grab sample of the MLSS/fixed growth solids stream and RAS would be collected prior to entering the anoxic basin and would be analyzed for nitrate. Also, at approximately the same time as the grab samples are taken, the anoxic basin temperature, pH, and a DO profile may be conducted. The DO profile should consist of no less than four measurement points. The location of measurements should include at a minimum: 1) one foot below the surface approximately one foot from the influent side near the middle width of the basin or vessel; 2) one foot from the bottom straight down from sample point (1); 3) one foot below the surface approximately one foot from the effluent side near the middle width of the basin, and 4) one foot from the bottom straight down from sample point 3. This is a minimum DO profile and it will be important for the operator to periodically conduct a more exhaustive DO profile throughout the anoxic basins as this will be a critical component in both the operation of the apparatus of the invention. Typically once per day, a grab sample should be collected from the MLSS/fixed growth solids stream and from the RAS so that the suspended solids of each can be determined. Finally, the operator should monitor air flow rates to each basin or vessel, say once in the morning and once prior to leaving the plant. Concurrent with this, the influent, MLSS/fixed growth solids stream, RAS, and WAS flow rates should be confirmed and logged. The optional air flow rate to the aerated anoxic zone may be designed to maintain completely mixed conditions, but not so high as to result in an average DO of more than about 0.2 mg/L. The rate of air flow to the oxic zone will typically be designed to maintain a minimum of 1 mg/L of DO at peak loadings. During the phase of start-up where the apparatus operated most efficiently, air flow to the aerated anoxic zone should be fined tuned to maximize the nitrification component but still maintain a negligible DO. This would enhance the overall total nitrogen removal of the plant; however, more operator attention would be required to prevent over aeration of the anoxic zone. The goal of close operator attention is for achieving a good settling biological floc so that the benefits of the high rate clarifier are maximized. It is also hypothesized that large, good settling floc that may escape capture in the high rate clarifier during periods of high flow will also have less of a clogging effect on the membranes compared with small, discrete particles, which could lodge into the pores of the membrane.

As noted in reference to FIGS. 6 and 7, the high rate clarifiers useful in the invention may employ one or more hydraulic optimization baffles and tube or plate settlers. These baffles are used to minimize short-circuiting of the influent flow to the effluent, thereby maximizing the effective volume and surface area of the high rate clarifier. Also as noted in FIGS. 6 and 7, a V-notch weir and scum baffle may be employed. The V-notch weir ensures minimal velocities at the effluent, thereby minimizing sludge blanket disturbance and carry-over of settled sludge.

Membrane media useful in the invention are those able to withstand washing or mechanical abrasion enough to remove retained materials, and may be characterized as organic polymeric membranes or inorganic membranes depending on the material performing the separation function. It is understood that an inorganic membrane might comprise organic materials, and vice versa. The material selected for the membrane should have numerous attributes that render the membrane suitable for filtration service, such as structural integrity to withstand the pressure gradients of filtration, oxygenation, and backflushing, and chemical resistance to attack or dissolution by the filtered species, filtrate, and chemical cleaning solutions such as chlorine, citric acid, sodium hydroxide, and other chemicals designed to minimize organic and inorganic fouling of the membrane. The material should also have the ability to be fabricated readily into the preselected membrane shape for a particular application. Additional design criteria and considerations in the fabrication of microfilter and ultrafilter devices are disclosed in Zeman, L. J., et al., Microfiltration and Ultrafiltration Principles and Applications, Marcel Dekker, Inc., New York, 1996, which is incorporated herein by reference, and especially in Chapter 6 titled Module Design and Membrane Configurations starting on page 327 of this reference.

Membranes available from TriSep Corporation, Goleta, Calif., under the trade designation "SpiraSep", are useful in the practice of the invention, especially for their ability to be backflushed. An article available on the TriSep web site, www.trisep.com, entitled "Spiral Wound Backflushable Ultrafiltration Element", explains the history and operational advantages of TriSep's spiral wound filter elements. Another TriSep Corporation publication, Gould, B., "Utilizing Spiral Wound Membrane Efficiencies for Ultrafiltration by Enabling Backflush Capabilities", was presented at the $12^{th}$ Annual Southwest Chemistry Workshop, Dallas Tex., Jul. 28-31, 2003. Both of these publications are incorporated herein by reference. As explained in these publications, conventional flat sheet membranes developed for use in reverse osmosis, ultrafiltration, and other applications are designed to handle high-pressure differentials between the feed and permeate side of the membrane, as long as the feed pressure is higher than the permeate pressure. Since during backflushing the pressure is higher on the permeate side than on the feed side, there was a need to develop a membrane that could withstand frequent cycling between normal operation and back flush operation. This required a good bond between the membrane material and its support fabric, typically a nonwoven material. Support fabrics are typically calendared to have a smooth surface finish to minimize membrane defects or pinholes. This smooth surface, however, makes developing a bond between the support fabric and membrane difficult. TriSep solved that problem by use of a fabric with the proper surface finish coupled with a reformulated membrane casting solution, which gave superior adhesion to the support fabric. TriSep also uses a specially developed membrane element adhesive that does not easily fail when the element is exposes to back flush pressure. The adhesive has especially good wetting properties to membrane materials such as polysulfone. Basic operating characteristics for these membranes are: a specific flux of 35 GFD or more per psi, 0.05-micron filtration, and 1,000 ppm chlorine tolerance. Other membrane materials may be useful as, well, such as polyacrylonitrile and polyvinylidenefluoride, although their wetting properties are not quite as good as polysulfone. These membrane media may operate immersed (submerged) in high rate clarifier effluent, in a negative pressure mode due to economic and operating advantages. The submersion depth is that depth sufficient to enhance oxygen transfer to the membrane reject stream and reduce or eliminate suction pressure required to withdraw the treated effluent permeate stream through the membrane media. Negative-pressure systems operate at extremely low trans-membrane pressures (TMP), which minimizes the effects of fouling and decreases pumping costs. Specifically, low operating pressures are desired as this minimizes compaction of the fouling layer. Thus, the permeate side of the spiral wound membranes operating in immersed condition may have a permeate pump suction pressure ranging from about −0.5 to about −10.0 psi, or operating at about −2 to about −5 psi at 35 GFD/psi or above, using the hydrophilic polysulfone membrane materials.

Another useful set of membranes are the polymeric ultrafiltration membranes described in U.S. Pat. No. 5,698,281, assigned to Millipore, incorporated by reference herein. This patent describes composite membranes comprising a nonfibrous microporous polyolefin or polysulfone substrate coated with an ultrafiltration layer formed of a polysulfone. The composite membranes of this patent are said to be resistant to degradation by contact with strong alkali solutions, such as 0.5 m NaOH. Thus, they can be cleaned and then reused. The polyolefin or polysulfone membrane substrate produced by phase separation has a pore size range of between about 0.05 and 10 microns and it has a bubble point between about 5 and 60 psi as determined by the visual bubble point method when isopropyl alcohol (IPA) is used as the wetting fluid. The polyolefin microporous membrane substrate can be formed, for example, by the process disclosed in U.S. Pat. Nos. 4,778,601 and 4,828,272 which are incorporated herein by reference. The composite membranes described in the 281 patent have a visual bubble point with IPA as the wetting fluid that is greater than the (IPA wet) visual bubble point of prior art membranes of at least 10 psi. The non-woven polyolefin microporous membrane utilized as the substrate for the composite membranes of the 281 patent can be formed from polypropylene or polyethylene including ultrahigh molecular weight polyethylene (UHMW-PE). The nonwoven sulfone polymer substrate can be formed of polysulfone, polyether sulfone, or polyarylsulfone. The polyolefin or sulfone polymer substrate is not degraded by contact with 0.5 m NaOH or other high pH cleaning solutions.

Another useful membrane class are those described in U.S. Pat. No. 5,522,991, also assigned to Millipore, and incorporated herein by reference. The defect-free cellulosic membrane of the 991 patent comprise a nonfibrous base resistant polymeric microporous substrate coated with an ultrafiltration layer formed of a cellulose or cellulose ester polymer. These membranes are stated to be resistant to degradation by contact with strong alkali solution, such as 0.5N NaOH, and also resistant to back pressures as high as about 100 psi. This feature is important, as certain apparatus and methods of the invention include backflushing and/or chemical cleaning to maintain good flux rates.

Representative inorganic ultrafiltration membranes include those described in U.S. Pat. No. 4,992,178, incorporated by reference herein. The inorganic ultrafiltration or microfiltration membrane described in this patent has an inorganic material separating layer and is characterized in that it comprises, prior to being used for an ultrafiltration or microfiltration operation, at least one hydrophilic copolymer or polymer having a molecular mass at the most equal to $10^5$, adsorbed on or in the separating layer of the inorganic membrane with a view to modifying the separating properties. The hydrophilic polymer with a molecular mass below $10^5$ adsorbed on or in the separating layer of the inorganic membrane, makes it possible to neutralize the residual charges of the separating layer and make it insensitive to clogging by mineral salts. Moreover, the choice of an appropriate hydrophilic copolymer or polymer makes it possible to modify the conditions of transfer of proteins through the ultrafiltration or microfiltration membrane and to vary certain properties of the membrane such as its selectivity with respect to solutes, its permeation flow rate or its rejection rate for one or more solutes.

Another useful set of membranes are those described in U.S. Pat. No. 6,221,247, incorporated herein by reference. The 247 patent is directed to microfiltration and ultrafiltration membranes comprising a microporous structure adapted to reject species having nominal sizes greater than about 10 micrometers. The microporous structure is described as a solid medium having pores that define passages extending form one outside surface completely through the medium to another outside surface. The diameters of the pores should be of a size operative to block the passage through the membrane of species suspended in a liquid which are larger than desired, i.e., larger than about 10 micrometers for ultrafiltration and microfiltration. At the same time, the pore diameters will allow the liquid and smaller particles to pass. The pores may be characterized directly by their physical dimensions or in other ways, such as by a "molecular weight cut off" ("MWCO"). MWCO is understood to be the molecular weight of a standard solute, such as monodisperse polyethylene oxide or dextran molecules of which about 90% is rejected by the microporous substrate. Accordingly, species of size greater than the characteristic pore diameter or molecular weight cut off theoretically will be rejected by a given microporous substrate. Foremost among the important properties of these membranes according to the 247 patent is that the membrane material has a suitably low surface energy that will make adsorption of the potentially fouling species less favorable than staying dispersed within the liquid in the feed mixture. It was found by the 247 patentees that many materials used in conventional membrane filtration processes have surface energy of about 30-80 dynes/cm. Polytetrafluoroethylene, "PTFE", the homopolymer of tetrafluoroethylene, is customarily deemed to anchor the low end of the useful range of surface energy for traditional membrane materials at about 18.5 dynes/cm. The term "low surface energy" is used in the 247 patent to mean materials with lower surface energy than PTFE and which thus provide greater resistance to fouling in microfiltration and ultrafiltration service. The 247 patent describes certain polymers comprising fluorine substituted dioxole monomer discovered to have a surface energy of about 15 dynes/cm. Exemplary of these low surface energy compositions are described in the 247 patent. One suitable monomer is known as perfluoro-2,2-dimethyl-1,3-dioxole, occasionally referred to as "PDD". In some embodiments, the low surface energy polymer comprises copolymerized PDD and at least one monomer selected from the group consisting of tetrafluoroethylene ("TFE"), perfluoromethyl vinyl ether, vinylidene fluoride and chlorotrifluoroethylene. In other embodiments, the copolymer is a dipolymer of PDD and a complementary amount of TFE, especially such a polymer containing 50-95 mole % of PDD. Examples of dipolymers are described in further detail in U.S. Pat. No. 4,754,009 of E. N. Squire, which issued on Jun. 28, 1988; and U.S. Pat. No. 4,530,569 of E. N. Squire, which issued on Jul. 23, 1985. Perfluorinated dioxole monomers are disclosed in U.S. Pat. No. 4,565,855 of B. C. Anderson, D. C. England and P. R. Resnick, which issued Jan. 21, 1986. The disclosures of all of these U.S. patents are hereby incorporated herein by reference. The copolymer of PDD is amorphous and can be characterized by its glass transition temperature ("Tg"). Glass transition temperature property of a polymer is understood in the art. It is the temperature at which the copolymer changes from a brittle, vitreous or glassy state to a rubbery or plastic state. The glass transition temperature of the amorphous copolymer will depend on the composition of the specific copolymer of the membrane, especially the amount of TFE or other comonomer that may be present. Examples of Tg are shown in FIG. 1 of the aforementioned U.S. Pat. No. 4,754,009 of E. N. Squire as ranging from about 260 C. for dipolymers with 15% tetrafluoroethylene comonomer down to less than 100.degree. C. for the dipolymers containing at least 60 mole % tetrafluoroethylene. It can be readily appreciated that perfluoro-2,2-dimethyl-1,3-dioxole copolymers according to this invention can be tailored to provide sufficiently high Tg that a membrane of such composition can withstand exposure to steam temperatures. Hence, membranes of this invention can be made stream sterilizable and thereby suitable for various uses requiring sterile materials, especially those involving biological materials. The glass transition temperature of the amorphous copolymer should be at least 115° C.

In certain embodiments, the membrane structure comprises a microporous substrate coated with a low surface energy material. The substrate material itself may, but need not exhibit low surface energy. The substrate can be any microporous material that allows passage of the filtrate. By "microporous" is meant that the structure has pores throughout which form continuous interstices or passageways extending from one side of the substrate through the thickness to the other side. Many conventional, readily available and thus generally inexpensive, microporous membrane substrate materials can be used provided that they are sufficiently compatible with the low surface energy material to accept a coating of the latter.

Generally organic or inorganic polymers mixed with organics can be used to prepare the microporous substrate material. Representative organic polymers suitable for the microporous substrates according to the invention include polysulfone; polyethersulfone; polycarbonate; cellulosic polymers, such as regenerated cellulose polymer, cellulose diacetate polymer, cellulose triacetate polymer, cellulose nitrate polymer, and blends of these; polyamide; polyimide; polyetherimide; polyurethane; polyester; polyacrylate and polyalkyl methacrylate, such as polymethyl methacrylate; polyolefin, such as polyethylene and polypropylene; saturated and unsaturated polyvinyls, such as polyvinyl chloride, polyvinyl fluoride, polyvinylidene chloride, polyvinylidene fluoride; polyvinyl alcohol, fluorine substituted polymer such as polytetrafluoroethylene and poly(tetrafluoroethylene-perfluoropropylvinylether); polyetheretherketone; polyacrylonitrile and polyphosphazine. Representative inorganic substrate compositions include zirconia, alumina, titanium dioxide, and $BaTiO_3$ based microporous media and the like.

The microporous membrane structure for use according to this invention thus generally comprises a low surface energy microporous substrate or a microporous substrate coated with a low surface energy composition on at least a portion that is in contact with the suspension during filtration. The microporous membrane structure would normally be installed in a module for convenient operation of filtration. The novel filtration method can be used with any of the well known module configurations, such as flat sheet, hollow fiber, tubular, spiral wound, and vortex devices (also known as "rotating" devices). Other useful configurations include pleated sheet and tube ribbon form. Membrane tubes and tube ribbons are disclosed in U.S. Pat. No. 5,565,166, which is incorporated herein by reference.

It is also acceptable to operate the novel method in either "dead end" or "cross flow" modes. "Dead end" mode here means the technique of admitting all feed suspension to a single inlet port on one side of the microporous membrane structure. Hence the feed suspension effectively flows into a chamber dead ended by the membrane structure. In contrast, "cross flow" here means providing a second port on the feed side of the membrane structure for discharge of excess feed. The two inlet ports are usually positioned to provide a flow across the surface of the feed side of the membrane structure. This is done to induce shear stress near the membrane structure which reduces concentration polarization. Dead end and cross flow modes are further described in the above mentioned Zeman et al. reference at pages 328-329.

The various advantages and disadvantages of the above-cited membrane module configurations and modes are understood by those of ordinary skill in the art. Selection of membrane module configuration and mode of operation typically devolves to choosing those which provide maximum advantage and least disadvantage for a specific separation to be effected.

Examples of tubular membranes, which may be easier to clean than hollow fiber or other membrane configurations, are those described in U.S. Pat. Nos. 4,707,261 and 4,747,946, incorporated herein by reference. The membranes described in these patents are parallel-flow tubular membrane ultrafiltration modules comprising an outer cylinder of a given length, and a plurality of water permeable non-woven fabric pipes each having a permeable membrane formed on the inside thereof and having substantially the same length as the given length of the outer cylinder. The cylinder has a common take-off port from the non-woven fabric pipes, the non-woven fabric pipes each being inserted into the outer cylinder in a closely bundled state with each other. Spaces between the outer cylinder and the non-woven fabric pipes at both end portions of the outer cylinder are filled solely with a first hardened synthetic resin bonding the pipes to each other and fixing them to the outer cylinder to provide sealing. The ends of each of the non-woven fabric pipes and the ends of the permeable membranes neighboring the ends of the non-woven fabric pipes are coated solely with a second synthetic resin which may be the same as or different from the first synthetic resin filling any spaces between the outer cylinder and the non-woven fabric pipes. Only the first and second resins are utilized for sealing and retaining the non-woven fabric pipes at the ends of the outer cylinder. The permeable membrane in each pipe typically has an inner diameter of about 4 to 25 mm. The non-woven fabric pipes are composed of polyesters, polyethylenes, polypropylenes or polyamides. The coating thickness of the cast synthetic resin at the open ends and on the inside of the non-woven fabric pipes is about 200 millimicrometers or less. The module may comprise 3 to 15 of the non-woven fabric pipes having a permeable membrane formed on the inside thereof, and the permeable membrane may have an inner diameter of about 7 to 13 mm.

Although the foregoing examples and description are intended to be representative of the invention, they are not intended to in any way limit the scope of the appended claims.

What is claimed is:

1. A method of treating wastewater comprising:
   a) flowing a stream comprising mixed liquor suspended solids and fixed growth solids to a high rate clarification stage, thus forming a high rate clarifier effluent, a first waste activated sludge stream, and a return activated sludge stream; and
   b) flowing the high rate clarifier effluent stream to a membrane stage comprising a membrane media, producing a membrane reject stream and a treated effluent permeate stream.

2. The method of claim 1 comprising, prior to the high rate clarification stage (a), a step (aa) of subjecting a screened raw wastewater to one or more steps selected from the group consisting of (i) an aerated anoxic stage and introducing a gas comprising oxygen to the wastewater during the aerated anoxic stage; (ii) an anaerobic stage; and (iii) a mixed only anoxic stage, to provide a level of nitrification and denitrification resulting in substantial nitrogen removal, and a level of biological or chemical phosphorus removal.

3. The method of claim 2 comprising allowing the product of step (aa) to flow to a stage selected from the group consisting of an aeration stage and a post anoxic stage prior to flowing to the high rate clarification stage, said product comprising mixed liquor suspended solids and fixed growth solids in which carbonaceous biochemical oxygen demand (CBOD) is consumed along with reduced nitrogen which is nitrified and denitrified.

4. The method of claim 2 wherein a portion of the first waste activated sludge stream is returned to the aerated anoxic stage as return activated sludge (RAS).

5. The method of claim 2 wherein a portion of the stream comprising mixed liquor suspended solids and fixed growth solids is returned to the aerated anoxic stage as mixed liquor suspended solids/fixed growth solids recycle.

6. The method of claim 1 wherein a portion of the membrane reject stream is recycled to a point in the process upstream of the high rate clarifier.

7. The method of claim 6 wherein a portion of the membrane reject stream is routed to waste activated sludge storage.

8. The method of claim 1 wherein the membrane is selected from the group consisting of hollow fiber membranes, flat sheet membranes, rolled sheet membranes, tubular membranes, spiral wound membranes, vortex devices, pleated sheet membranes, tube ribbon membranes, and combinations thereof.

9. The method of claim 1 comprising admitting a gas comprising oxygen as a membrane scouring agent.

10. The method of claim 1 comprising using a gas comprising oxygen to flush scum and waste activated sludge from the membrane.

11. The method of claim 1 wherein the membrane media is submerged at a reasonable depth in the high rate clarifier effluent to enhance oxygen transfer to the membrane reject stream and reduce or eliminate suction pressure required to withdraw the treated effluent permeate stream through the membrane media.

12. An apparatus for treating wastewater comprising:
a) a high rate clarifier adapted to accept a stream comprising mixed liquor suspended solids and fixed growth solids, and form a high rate clarifier effluent, a first waste activated sludge stream, and a return activated sludge stream; and
b) a membrane unit comprising a membrane media, the membrane unit adapted to accept the high rate clarifier effluent, and produce a membrane reject stream and a treated effluent permeate stream.

13. The apparatus of claim 12 comprising an aerated anoxic vessel fluidly connected to and upstream of the high rate clarifier.

14. The apparatus of claim 13 comprising means for introducing a gas comprising oxygen to the wastewater adapted to traverse through the aerated anoxic vessel sufficient for mixing and partial oxygenation of the wastewater for producing an acceptable level of simultaneous nitrification and denitrification.

15. The apparatus of claim 12 comprising means for allowing the product of step (a) to flow to an aeration vessel, producing the stream comprising mixed liquor suspended solids and fixed growth solids.

16. The apparatus of claim 15 comprising means for flowing the stream comprising mixed liquor suspended solids and fixed growth solids from the aeration vessel to the high rate clarifier.

17. The apparatus of claim 12 wherein the high rate clarifier has a surface overflow rate that is greater than 500 gallons/day/ft$^2$ at average design influent flow rate.

18. The apparatus of claim 12 wherein the high rate clarifier has a surface overflow rate that is greater than 2,000 gallons/day/ft$^2$ at average design influent flow rate.

19. The apparatus of claim 12 wherein the high rate clarifier has a surface overflow rate that ranges from about 500 to about 2,000 gallons/day/ft$^2$ at design average flow rates and hydraulic residence times less than about 2 hours.

20. The apparatus of claim 12 wherein the high rate clarifier comprises a settler selected from plate settlers and tube settlers.

21. The apparatus of claim 12 wherein the high rate clarifier is part of a package wastewater treatment plant including an aerated anoxic vessel and an aeration vessel.

22. The apparatus of claim 12 comprising a hydraulics optimization baffle in the high rate clarifier.

23. The apparatus of claim 12, the membrane unit comprising a level switch that controls treated effluent flow from the membrane unit and backflushing of the membrane media.

24. The apparatus of claim 12 comprising means for introducing a gas comprising oxygen as a membrane media scouring agent and membrane unit oxygenation system for continuous biological treatment.

25. The apparatus of claim 12 wherein the membrane media is submerged at a reasonable depth in the high rate clarifier effluent to enhance oxygen transfer to the membrane reject stream and reduce or eliminate suction pressure required to withdraw the treated effluent permeate stream through the membrane media.

* * * * *